(12) United States Patent
Liao et al.

(10) Patent No.: US 8,200,725 B2
(45) Date of Patent: Jun. 12, 2012

(54) ARITHMETIC PROCESSING SYSTEM AND METHOD THEREOF

(75) Inventors: Kun-Chi Liao, Taichung (TW); Yu-Ting Lee, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 1253 days.

(21) Appl. No.: 11/935,420

(22) Filed: Nov. 6, 2007

(65) Prior Publication Data

US 2009/0070399 A1    Mar. 12, 2009

(30) Foreign Application Priority Data

Mar. 27, 2007  (TW) ................................ 96110612 A

(51) Int. Cl.
*G06F 7/00* (2006.01)
(52) U.S. Cl. ......................... 708/200; 708/444; 708/523
(58) Field of Classification Search .................. None
See application file for complete search history.

(56) References Cited

U.S. PATENT DOCUMENTS 5,617,473 A * 4/1997 Wietecha et al. ........ 379/399.02
5,831,888 A * 11/1998 Glover .......................... 708/801

\* cited by examiner

*Primary Examiner* — Lewis A Bullock, Jr.
*Assistant Examiner* — Michael D Yaary
(74) *Attorney, Agent, or Firm* — Thomas|Kayden

(57) ABSTRACT

An arithmetic processing system processes a sensing signal and a first approximate offset signal to obtain a second approximate offset signal. The system includes a first arithmetic processor and a second arithmetic processor. The first arithmetic processor receives and processes the sensing signal and the first approximate offset signal to output a first arithmetic signal. The second arithmetic processor processes the first arithmetic signal to output a second arithmetic signal, and the second arithmetic signal is added with a predetermined offset signal to obtain the second approximate offset signal, and the second approximate offset signal is closer to a real offset signal of the sensing signal than the first approximate offset signal. A method of arithmetic processing is also disclosed.

13 Claims, 2 Drawing Sheets

ARITHMETIC PROCESSING SYSTEM AND METHOD THEREOF

BACKGROUND OF THE INVENTION

1. Field of the Invention

The invention relates to arithmetic processing systems and methods, and in particular relates to arithmetic processing system and method for obtaining an offset signal of a sensing signal.

2. Description of the Related Art

For conventional photography apparatuses, a sensor is used to sense the variation in movement of the apparatus to obtain a sensing signal. The sensing signal senses the variation in movement of the apparatus and uses the information to compensate for the movement so as to insure the quality of the picture taken by the user.

However, most sensors are usually susceptible to temperature drift effects. That is, the sensor characteristics will change due to the changing environment or temperature, thus, influencing the sensing signal outputted by the sensor. For example, when the environment or temperature changes for the photography apparatus, the outputted sensing signal, despite the sensors having the same setting, will drift as the environment or temperature changes, thus decreasing the accuracy of the sensors.

Therefore, a method for obtaining a real offset signal of a sensing signal is required in order to improve the reliability and accuracy of the sensed data.

BRIEF SUMMARY OF INVENTION

An arithmetic processing system is provided according to an embodiment of the invention. The system processes a sensing signal and a first approximate offset signal with arithmetic processing to obtain a second approximate offset signal. The arithmetic processing system comprises a first arithmetic processor and a second processor. The first arithmetic processor receives and processes the sensing signal and the first approximate offset signal for outputs a first arithmetic processing signal. The second arithmetic processor processes the first arithmetic signal to output a second arithmetic signal and adds the second arithmetic signal to a predetermined offset signal to obtain the second approximate offset signal, wherein the second approximate offset signal is closer to a real offset signal of the sensing signal than the first approximate offset signal.

An arithmetic processing method is provided according to another embodiment of the invention. The method processes a sensing signal and a first approximate offset signal with arithmetic processing to obtain a second approximate offset signal wherein the second offset signal is closer to a real offset signal of the sensing signal than the first offset approximate signal. The method comprises: comparing the sensing signal and the first approximate offset signal for obtaining an error signal; integrating the error signal for obtaining a first arithmetic signal; multiplying the first arithmetic signal by a constant for obtaining a second arithmetic signal; and adding the second arithmetic signal to a predetermined offset signal for obtaining the second approximate offset signal.

The arithmetic processing system and method of the invention achieves a more exact and real offset signal of the sensing signal, thus, improving the reliability and accuracy of obtained data, even under the influence of a changing environment or temperature.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
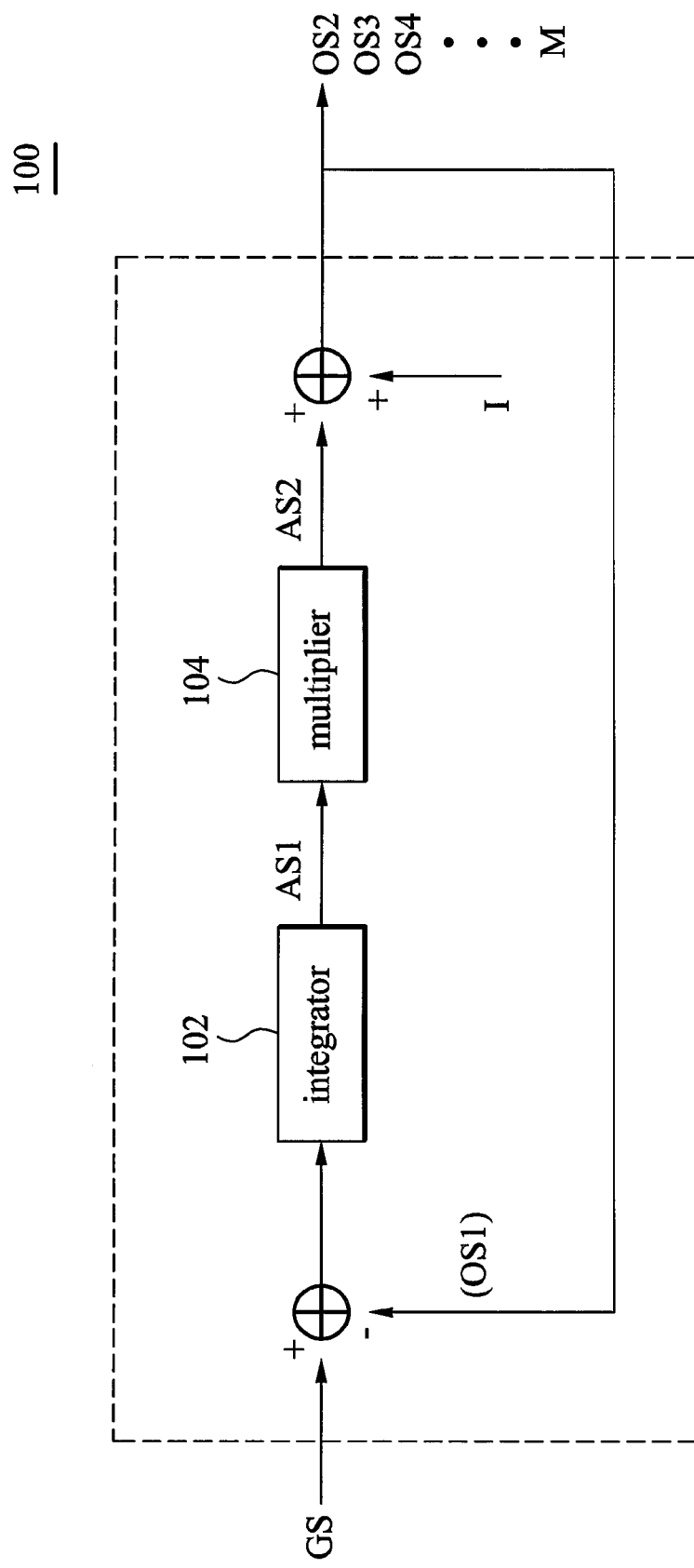
FIG. 1 is an illustrated diagram of an arithmetic processing system according to an embodiment of the invention.

FIG. 1 is an illustrated diagram of an arithmetic processing system 100 according to an embodiment of the invention. The arithmetic processing system 100 processes a sensing signal GS and a first approximate offset signal OS1 to obtain a second approximate offset signal OS2. The second approximate offset signal OS2 is closer to a real offset signal M of the sensing signal than the first approximate offset signal OS1. The first approximate offset signal OS1 is a presumption offset signal derived from the experimental result of the formula:

$$M(1-e^{-kt})+I \cdot e^{-kt} \qquad \text{formulation (a)}$$

Wherein, M represents the real offset signal of the sensing signal GS, I represents a predetermined offset signal provided for arithmetic processing of the arithmetic processing system 100, k represents a constant or a positive convergence factor, and t represents a time variable. The arithmetic processing system 100 comprises an integrator 102 and a multiplier 104. The integrator 102 integrates an error signal derived from comparing the sensing signal GS and the first approximate offset signal OS1 and outputs a first arithmetic signal AS1. The multiplier 104 receives the first arithmetic signal AS1 and multiplies the first arithmetic signal AS1 by a constant for outputting a second arithmetic signal AS2. The second arithmetic signal AS2 is added to the predetermined offset signal I for obtaining the second approximate offset signal OS2.

Then, the second approximate offset signal OS2 is fed back to the arithmetic processing system 100. The arithmetic processing system 100 processes the sensing signal GS and the second approximate offset signal OS2 for obtaining a third approximate offset signal OS3. Wherein, the third approximate offset signal OS3 is closer to a real offset signal M of the sensing signal than the second approximate offset signal OS2. Then, the third approximate offset signal OS3 is fed back to the arithmetic processing system 100.

In this method, an approximate offset signal closer to the real offset signal M can be obtained by repeatedly feeding the output approximate offset signal back to the arithmetic processing system 100 for arithmetic processing. The arithmetic processing of the arithmetic processing system 100 can be illustrated by the following formula:

$$OS(t)=I+k\int [GS(t)-OS(t)]dt \qquad \text{formulation (b)}$$

Wherein, OS represents an approximate offset signal, and K represents a constant.

The inference process of formulation (b) is illustrated below by an embodiment. The sensing signal GS comprises a real offset signal M, a data signal D and an Additive White Gaussian Noise n, which is:

$$GS(t)=M+D(t)+n(t) \qquad \text{formulation (c)}$$

Integrating the sensing signal GS(t):

$$\int GS(t)dt = \int [M+D(t)+n(t)]dt = \int Mdt + \int D(t)dt + \int n(t)dt$$

Wherein, the data signal D is a stable signal, therefore the integrating value thereof is zero, and the integrating result of AWGN n is zero as well. Thus:

$$\int GS(t)dt = \int Mdt \qquad \text{formulation(d)}$$

Then, deriving the following by integrating the approximate offset signal OS and connecting the formulation (d):

$$\int OS(t)dt = \int [M(1-e^{-kt})+I\cdot e^{-kt}]dt = \int Mdt - (M-I)\int e^{-kt} = \int GS(t) - (M-I)\int e^{-kt}dt$$

Thus, when $t \to \infty$:

$$M = OS(t) = I + K\int [GS(t)-OS(t)]dt$$

Therefore, the real offset signal M can be obtained from the arithmetic processing system 100 after the arithmetic processing system 100 repeatedly processes each approximate offset values obtained from each arithmetic processing.

Figure 2:
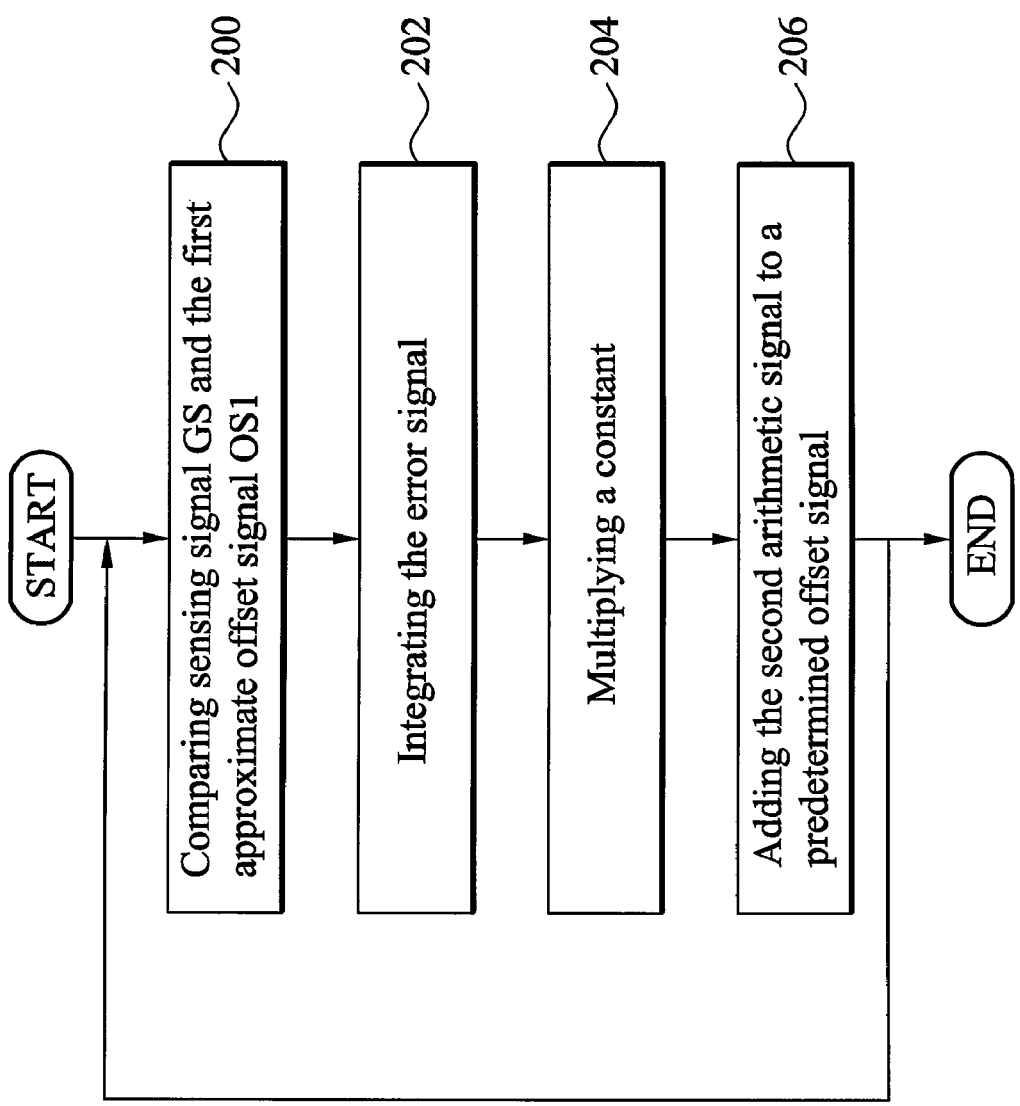
FIG. 2 is a flow chart illustrating an arithmetic processing method according to an embodiment of the invention.

FIG. 2 is a flow chart illustrating an arithmetic processing method according to an embodiment of the invention. The method processes a sensing signal GS and a first approximate offset signal OS1 with arithmetic processing to obtain a second approximate offset signal OS2. The second approximate offset signal OS2 is closer to a real offset signal M of the sensing signal than the first approximate offset signal OS1. The first approximate offset signal OS1 is represented by formulation (a) as well. First, the sensing signal GS and the first approximate offset signal OS1 is compared to obtain an error signal representing the difference between the two signals (step 200). Then, the error signal is integrated to obtain a first arithmetic signal (step 202). Further, the first arithmetic signal is multiplied by a constant to obtain a second arithmetic signal (step 204). Then, the second arithmetic signal is added to a predetermined offset signal to obtain a second approximate offset signal OS2 (step 206).

Meanwhile, after obtaining the second approximate offset signal OS2, the steps proceed back to step 200. Where the sensing signal GS is compared to the second approximate offset signal OS2, after which the steps proceed to integration processing (step 202), multiplication processing (step 204), and adding with the predetermined offset value to obtain the third approximate signal OS3 (step 206). The third approximate signal OS3 is closer to a real offset signal M than the second approximate offset signal OS2. By using this method, each approximate offset signal is repeatedly processed with arithmetic processing to move closer and closer to obtaining the real offset value M. The arithmetic processing method and result can be represented by formulation (b).

As described above for the embodiment of the invention, the real offset signal of the sensing signal can be exactly obtained by the arithmetic processing system and method in order to improve the reliability and accuracy of the obtained data, even under the influence of a changing environment or temperature.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. An arithmetic processing system processing a sensing signal and a first approximate offset signal with arithmetic processing to obtain a second approximate offset signal, the arithmetic processing system comprising:
    a first arithmetic processor, for receiving and processing the sensing signal and the first approximate offset signal and outputting a first arithmetic processing signal;
    a second arithmetic processor, for processing the first arithmetic signal to output a second arithmetic signal, and adding the second arithmetic signal to a predetermined offset signal to obtain the second approximate offset signal, wherein the second approximate offset signal is closer to a real offset signal of the sensing signal than the first approximate offset signal, wherein the first approximate offset signal is a presumption offset signal, and a formulation representing the first approximate offset signal is:

$$M(1-e^{-kt})+I\cdot e^{-kt},$$

wherein M represents the real offset signal, I represents the predetermined offset signal, k represents a constant, and t represents a time variable.

2. The arithmetic processing system of claim 1, wherein the second approximate offset signal is further fed back to the arithmetic processing system, and the arithmetic processing system processes the sensing signal and the second approximate offset signal with arithmetic processing to obtain a third offset approximate offset signal.

3. The arithmetic processing system of claim 2, wherein the third approximate offset signal is closer to the real offset signal than the second approximate offset signal.

4. The arithmetic processing system of claim 1, wherein the arithmetic processing system repeatedly processes each obtained approximate offset signal to obtain the real offset signal.

5. The arithmetic processing system of claim 1, wherein the first arithmetic processor is an integrator.

6. The arithmetic processing system of claim 5, wherein the integrator integrates an error signal obtained from comparing the sensing signal and the first approximate offset signal for outputting the first arithmetic signal.

7. The arithmetic processing system of claim 1, wherein the second arithmetic processor is a multiplier.

8. The arithmetic processing system of claim 7, wherein the multiplier multiplies the first arithmetic signal with a positive convergence constant for outputting the second arithmetic signal.

9. An arithmetic processing method for processing a sensing signal and a first approximate offset signal with arithmetic processing to obtain a second approximate offset signal wherein the second offset signal is closer to a real offset signal of the sensing signal than the first offset approximate signal, comprising:
    (a) comparing, by a first arithmetic processor, the sensing signal and the first approximate offset signal for obtaining an error signal;
    (b) integrating the error signal for obtaining a first arithmetic signal;
    (c) multiplying the first arithmetic signal by a constant for obtaining a second arithmetic signal; and
    (d) adding, by a second arithmetic processor the second arithmetic signal to a predetermined offset signal for obtaining the second approximate offset signal; wherein the first approximate offset signal is a presumption offset signal, and a formulation representing the first approximate offset signal is:

$$M(1-e^{-kt})+I\cdot e^{-kt},$$

wherein M represents the real offset signal, I represents the predetermined offset signal, k represents a second constant, and t represents a time variable.

10. The arithmetic processing method of claim 9, further comprising the following steps proceeding from step (d):
   (e) comparing the sensing signal and the second approximate offset signal for obtaining a second error signal;
   (b) integrating the second error signal for obtaining a third arithmetic signal;
   (c) multiplying the third arithmetic signal by the constant for obtaining a fourth arithmetic signal; and
   (d) adding the fourth arithmetic signal to a predetermined offset signal for obtaining the third approximate offset signal.

11. The arithmetic processing method of claim 10, wherein the third offset signal is closer to the real offset signal than the second offset approximate signal.

12. The arithmetic processing method of claim 9, further comprising:
   repeatedly processing each approximate offset signal obtained from the step (a) to (d) with arithmetic processing for obtaining the real offset signal.

13. The arithmetic processing method of claim 9, wherein the constant is a positive convergence constant.

* * * * *